United States Patent
Kwon et al.

(10) Patent No.: US 10,193,735 B2
(45) Date of Patent: Jan. 29, 2019

(54) POWER ALLOCATION FOR SUPERPOSITION TRANSMISSION

(71) Applicants: Hyukjoon Kwon, San Diego, CA (US); Sandeep Krishnamurthy, Mountain View, CA (US); Linbo Li, San Diego, CA (US); Jungwon Lee, San Diego, CA (US)

(72) Inventors: Hyukjoon Kwon, San Diego, CA (US); Sandeep Krishnamurthy, Mountain View, CA (US); Linbo Li, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 281 days.

(21) Appl. No.: 15/014,800

(22) Filed: Feb. 3, 2016

(65) Prior Publication Data

US 2016/0366691 A1    Dec. 15, 2016

Related U.S. Application Data

(60) Provisional application No. 62/173,241, filed on Jun. 9, 2015, provisional application No. 62/203,818, filed
(Continued)

(51) Int. Cl.
*H04L 27/34* (2006.01)
*H04L 27/18* (2006.01)
(Continued)

(52) U.S. Cl.
CPC ........ *H04L 27/3405* (2013.01); *H04L 1/0001* (2013.01); *H04L 1/007* (2013.01);
(Continued)

(58) Field of Classification Search
CPC ... H04L 27/3405; H04L 1/0001; H04L 1/007; H04L 5/003; H04L 27/18; H04L 1/0003;
(Continued)

(56) References Cited

U.S. PATENT DOCUMENTS

| 7,079,585 | B1 | 7/2006 | Settle et al. |
| 7,167,513 | B2 | 1/2007 | Tsui et al. |

(Continued)

OTHER PUBLICATIONS

Yazaki, Takahiro et al., Effect of Joint Detection and Decoding in Non-orthogonal Multiple Access, Copyright 2014 IEEE 2014 IEEE 2014 IEEE International Symposium on Intelligent Signal Processing and Communication System (ISPACS) Dec. 1-4, 2014, pp. 245-250.

(Continued)

*Primary Examiner* — Eric Myers
(74) *Attorney, Agent, or Firm* — The Farrell Law Firm, P.C.

(57) ABSTRACT

Apparatuses, systems, and methods are described for power allocation in a superposition multiple access communication system capable of using non-uniform joint constellations or super-constellations. In one method, the conditional probability of a correctly-received symbol and a normalized weighting coefficient is calculated for each receiver and then the sum of weighted efficiencies is calculated. The optimal power allocation is determined for each receiver by maximizing the sum of weighted spectral efficiencies.

19 Claims, 7 Drawing Sheets

Related U.S. Application Data on Aug. 11, 2015, provisional application No. 62/204,305, filed on Aug. 12, 2015, provisional application No. 62/210,326, filed on Aug. 26, 2015.

(51) Int. Cl.
    *H04W 72/04*     (2009.01)
    *H04L 5/00*     (2006.01)
    *H04L 1/00*     (2006.01)

(52) U.S. Cl.
    CPC .............. *H04L 5/003* (2013.01); *H04L 27/18* (2013.01); *H04W 72/0473* (2013.01); *H04L 1/0003* (2013.01); *H04L 1/0009* (2013.01); *H04L 27/3411* (2013.01)

(58) Field of Classification Search
    CPC .............. H04L 1/0009; H04L 27/3411; H04W 72/0473
    See application file for complete search history.

(56) References Cited

U.S. PATENT DOCUMENTS

| | | | |
|---|---|---|---|
| 7,653,164 | B2 | 1/2010 | Lin et al. |
| 7,965,793 | B2 | 6/2011 | Golitscheik Edler Von Elbwart et al. |
| 8,385,457 | B2 | 2/2013 | Laudel et al. |
| 8,824,601 | B2 | 9/2014 | Malladi |
| 9,042,476 | B2 | 5/2015 | Krishnamurthy |
| 2014/0078939 | A1* | 3/2014 | Shirani-Mehr ....... H04W 52/24 370/277 |
| 2014/0086160 | A1 | 3/2014 | Kim et al. |
| 2014/0241378 | A1 | 8/2014 | Vanderhaegen et al. |
| 2015/0139293 | A1 | 5/2015 | Stanwood et al. |
| 2015/0156050 | A1 | 6/2015 | Nishimoto et al. |
| 2017/0324513 | A1* | 11/2017 | Yuan ..................... H04L 1/0058 |

OTHER PUBLICATIONS

Yang, Shenghao, Superposition Coding for Linear Operator Channels over Finite Fields, Copyright 2012 IEEE, 2012 IEEE Information Theory Workshop, pp. 502-506.

Vanka, S. et al., Superposition Coding Strategies: Design and Experimental Evaluation, Copyright 2012 IEEE IEEE Transactions on Wireless Communications, vol. 11, No. 7, Jul. 2012, pp. 2628-2639.

Vizi, P. et al., Scheduling using Superposition Coding: Design and Software Radio Implementation, Copyright 2011 IEEE, Radio and Wireless Symposium 2011, pp. 154-157.

Sung, Chang Kyung et al., Channel Quantization Using Constellation Based Codebooks for Multiuser MIMO-OFDM, Copyright 2014 IEEE IEEE Transactions on Communications, vol. 62, No. 2, Feb. 2014, pp. 578-589.

Song, Jian et al., Approaching Capacity Region for Two-User GBC With Bit-Division Multiplexing, Copyright 2014 IEEE, IEEE Transactions on Vehicular Technology, vol. 64, No. 7, Jul. 2015, pp. 3311-3316.

Schaepperle, Joerg, Throughput of a Wireless Cell Using Superposition Based Multiple-Access with Non-ideal Interference Cancellation, Copyright 2010 IEEE 2010 IEEE 21st International Symposium on Personal, Indoor and Mobile Radio Communications Workshops, pp. 372-375.

Saito, Keisuke et al., Performance and Design of SIC Receiver for Downlink NOMA With Open-Loop SU-MIMO, Copyright 2015 IEEE IEEE ICC 2015—Workshop on 5G & Beyond—Enabling Technologies and Applications, Jun. 8-12, 2015, pp. 1161-1165.

Saito, Yuya et al., Non-Orthogonal Multiple Access (NOMA) for Cellular Future Radio Access, Copyright 2013 IEEE, pp. 5.

Saito, Keisuke et al., Link-level Performance of Downlink NOMA with SIC Receiver Considering Error Vector Magnitude, Copyright 2015 IEEE, IEEE 81st VTC (May 11-14, 2015), pp. 5.

Nikopour, Hosein et al., SCMA for Downlink Multiple Access of 5G Wireless Networks, Copyright 2014 IEEE Globecom 2014—Wireless Communications Symposium, Dec. 8-12, 2014, pp. 3940-3945.

Lu, Xuanxuan et al., Cooperative Transmission through Signal-Superposition-Based Braid Coding, Copyright 2015 IEEE IEEE Transactions on Vehicular Technology, May 26, 2015, pp. 14.

Lindbom (Ericsson), Lars et al., Enhanced Inter-cell Interference Coordination for Heterogeneous Networks in LTE-Advanced: A Survey, Dec. 7, 2011, pp. 18.

Kim, Beomju et al., Non-orthogonal Multiple Access in a Downlink Multiuser Beamforming System, Copyright 2013 IEEE, 2013 IEEE Military Communications Conference, pp. 1278-1283.

Jin, Huangping et al., On Two-user Degraded GBC with Finite Input Constellations, Copyright 2015 IEEE 2015 IEEE Wireless Communications and Networking Conference (WCNC 2015)—Track 2: MAC and Cross-Layer Design, pp. 1249-1254.

Hojeij, Marie-Rita et al., Resource Allocation in Downlink Non-orthogonal Multiple Access (NOMA) for Future Radio Access, Copyright 2015 IEEE, May 2015, pp. 6.

Khormuji, Majid Nasiri, Generalized Semi-Orthogonal Multiple-Access for Massive MIMO, Copyright 2015 IEEE, May 11, 2015, pp. 5.

Eom, Seungyeon et al., The Simple Near-Optimal Pairing Scheme of Superposition Coding in Downlink DS-CDMA Multi-path Channel, Copyright 2007 IEEE, pp. 1065-1069.

Dai, Xiaoming et al., Successive Interference Cancelation Amenable Multiple Access (SAMA) for Future Wireless Communications, Copyright 2014 IEEE Proceedings of the 2014 IEEE ICCS, pp. 222-226.

Choi, Byonghyok et al., Superposition Coding and Linear Network Coding for Reliable Multicast Over Fading Channels, Copyright 2008 IEEE, pp. 7.

Choi, Jinho, Non-Orthogonal Multiple Access in Downlink Coordinated Two-Point Systems, Copyright 2014 IEEE IEEE Communications Letters, vol. 18, No. 2, Feb. 2014, pp. 313-316.

Ahmed, Ali et al., Compressive Multiplexing of Correlated Signals, Copyright 2014 IEEE, IEEE Transactions on Information Theory, vol. 61, No. 1, Jan. 2015, pp. 479-498.

Choi, Jinho, H-ARQ based Non-Orthogonal Multiple Access with Successive Interference Cancellation, Copyright 2008 IEEE, pp. 5.

3GPP TSG RAN WG1 #80bis, Apr. 20-24, 2015, Belgrade, Serbia, Multiuser superposition schemes, pp. 4.

3GPP TSG RAN WG1 Meeting #80bis, Belgrade, Serbia, Apr. 20-24, 2015, Discussion on Multiuser Superposition Schemes, pp. 5.

3GPP TSG RAN WG1 meeting 81, Fukuoka, Japan, May. 25-29, 2015, Candidate schemes for superposition transmission, pp. 11.

3GPP TSG RAN WG1#80b, Belgrade, Serbia, Apr. 20-24, 2015, Candidate schemes for superposition transmission, pp. 11.

3GPP TSG RAN WG1 Meeting #81, Fukuoka, Japan, May 25-29, 2015, Discussion on Multiuser Superposition Schemes and Initial Link Level Results, pp. 6.

3GPP TS 36.211 V12.5.0 (Mar. 2015), 3rd Generation Partnership Project; Technical Specification Group Radio Access Network; Evolved Universal Terrestrial Radio Access (E-UTRA); Physical channels and modulation, (Release 12), pp. 136.

3GPP TS 36.212 V12.0.0 (Dec. 2013), 3rd Generation Partnership Project; Technical Specification Group Radio Access Network; Evolved Universal Terrestrial Radio Access (E-UTRA); Multiplexing and channel coding, (Release 12), pp. 87.

3GPP TSG RAN1 Meeting #82, Beijing, Aug. 24-28, 2015, Considerations for User Power Allocation in MUST, pp. 4.

3GPP TSG RAN1 Meeting #82, Beijing, Aug. 24-28, 2015, Bit to Symbol Mapping for Multiuser Superposition Transmission, pp. 9.

Wang, Shiqiang et al., Constellation Mapping for Physical-Layer Network Coding with M-QAM Modulation Global Communications Conference (GLOBECOM), Dec. 3-7, 2012, 2012 IEEE, pp. 7.

* cited by examiner

POWER ALLOCATION FOR SUPERPOSITION TRANSMISSION

PRIORITY

This application claims priority under 35 U.S.C. § 119(e) to a U.S. Provisional Patent Application filed on Jun. 9, 2015 in the United States Patent and Trademark Office and assigned Ser. No. 62/173,241, a U.S. Provisional Patent Application filed on Aug. 11, 2015 in the United States Patent and Trademark Office and assigned Ser. No. 62/203,818, a U.S. Provisional Patent Application filed on Aug. 12, 2015 in the United States Patent and Trademark Office and assigned Ser. No. 62/204,305, and a U.S. Provisional Patent Application filed on Aug. 26, 2015 in the United States Patent and Trademark Office and assigned Ser. No. 62/210,326, the entire contents of each of which are incorporated herein by reference.

FIELD OF THE DISCLOSURE

The present disclosure relates generally to power management for multiple access communication technologies, and more particularly, to power allocation when performing superposition multiple access transmission.

BACKGROUND

The amount of data traffic on wireless communications continues to increase at an almost exponential rate. For example, many cell phone users expect their cell phones to routinely handle both the ability to surf the Internet at any time and to stream movies-sometimes at the same time. Thus, new ways of further maximizing data throughput are continually discussed and often implemented in each new version of a standard.

One way to increase throughput (when there are multiple receivers) is superposition multiple access (it is also known by other names), which will be described more fully below. This multiple access method has recently increased its importance as it is under serious consideration by the standards organization $3^{rd}$ Generation Partnership Project (3GPP) to be part of the next Long Term Evolution (LTE) release. See, e.g., Chairman's Notes, 3GPP RAN1 Meeting #80b, Belgrade (2014, Apr. 20). Within and without 3GPP, the particular implementation of superposition multiple access being developed for probable implementation is often called Multi-User Superposition Transmission (MUST), but it has various names and different types, including, and not limited to, Non-Orthogonal Multiple Access (NOMA), Semi-Orthogonal Multiple Access (SOMA), Rate-adaptive constellation Expansion Multiple Access (EMA), Downlink Multiple User (DL MU), etc. The present disclosure is not limited to any of the afore-mentioned technologies, but has wide applicability to any superposition communication technology. Any of these terms as used in this disclosure should be understood in their proper context and/or broadest scope.

In general, multiple access superposition refers to communicating to multiple users by linearly combining amplitude-weighted, encoded, and/or modulated messages. For example, FIG. 1 has Base Station (BS) 110 and two users (or User Equipments (UEs)), a near UE 120 and a far UE 130 ("near" and "far" referring to their relative distances from BS 110). Both the near UE 120 and the far UE 130 receive the same signal x, comprising symbol $x_N$ for the near UE 120 and symbol $x_F$ for far UE 130, which can be represented by Equation (1):

$$x = \sqrt{\alpha_N} x_N + \sqrt{\alpha_F} x_F \qquad (1)$$

where $\alpha$ generally refers to transmission power, and thus $\alpha_N$ is the transmission power allocated to the near user signal and $\alpha_F$ is the transmission power allocated to the far user, where $\alpha_N + \alpha_F = 1$. Sometimes α refers more generally to the ratio of near user power to far user power, as shown in FIG. 2, which is discussed further below.

Speaking simplistically, near UE 120 decodes symbol $x_F$ for far UE 130 and uses it to cancel $x_F$ as interference, thereby decoding symbol $x_N$ intended for the near UE 120. One reiterative process for this type of cancellation is "Successive Interference Cancellation" or SIC. The far UE 130, on the other hand, simply decodes its own signal $x_F$ (although it is possible for the far user to also perform some form of signal cancellation to eliminate $x_N$).

Generally herein, far user symbol $x_F$ corresponds to $K_F$ bits of data represented as $(d_0^F d_1^F \ldots d_{K_F-1}^F)$ and near user symbol $x_N$ corresponds to $K_N$ bits of data represented as $(d_0^N d_1^N \ldots d_{K_N-1}^N)$.

FIG. 2 shows an example of a "super-constellation" formed of a (QPSK, QPSK) modulation pair under MUST. "(QPSK, QPSK)" means that both the far and near UE signals are modulated by QPSK. FIG. 2 is the result of a direct symbol mapping (DSM) of QPSK using Equation (1) for both the near and far users, i.e., a 16-QAM super-constellation. Moreover, in FIG. 2, the constituent $x_F$ and $x_N$ symbols are separately Gray encoded.

Each of the four bit symbols in the 16-QAM super-constellation in FIG. 2 comprises two bits for the symbol intended for the far user and two bits of the symbol intended for the near user. More specifically, each four-bit symbol ($b_0$, $b_1$, $b_2$, $b_3$) comprises ($b_0$, $b_1$) = $(d_0^F d_1^F)$, the two bits for the far user, and ($b_2$, $b_3$) = $(d_0^N d_1^N)$, the two bits for the near user. Thus, the far user constellation is relatively coarse, because each quadrant represents only one symbol (for example, the upper right quadrant is (00)), while each quadrant of the near user constellation has all four symbols (00, 01, 10, and 11). However, because the near user is nearer, the near user's received signal is stronger and it will be easier for the near user to distinguish that level of detail than the far user.

In theory, having the near user employ Successive Interference Cancellation (SIC) by codeword, where the far user codeword is decoded, the original encoded far user codeword reconstructed using the decoded codeword, and then the reconstructed original signal cancelled from the overall signal prior to decoding, is optimal in the sense that it achieves capacity.

SUMMARY

Accordingly, the present disclosure has been made to address at least the problems and/or disadvantages described above and to provide at least the advantages described below.

According to one aspect of the present disclosure, a method of power allocation in a superposition multiple access communication system capable of using uniform and non-uniform superposition constellations (super-constellations) is provided, including, for each receiver i receiving superposition multiple access transmission, calculating the conditional probability $P_{c,i}$ of a bit being correctly received based on its location within the super-constellation; for each receiver i receiving superposition multiple access transmission, calculating a normalized weighting coefficient $w_i$; calculating the sum S of weighted spectral efficiencies of all receivers i using the conditional probability $P_{c,i}$ and normalized weighting coefficient $w_i$ of each receiver i; and determining the optimal power allocation $\alpha^*_i$ for receiver i by maximizing the sum of weighted spectral efficiencies.

According to another aspect of the present disclosure, a method for a user equipment (UE) is provided, including receiving an indication that superposition transmission is being used to transmit to the UE; receiving an indication of which type of superposition transmission is being used to transmit to the UE, wherein at least one type of superposition transmission uses a Gray-mapped Non-uniform-capable Constellation (GNC) super-constellation; and receiving one or more superposition transmission parameters, including information concerning power allocation for the UE, wherein the power allocation for the UE was determined by: calculating the conditional probability of a bit being correctly received by the UE based on its location within the super-constellation; calculating a normalized weighting coefficient for the UE; calculating the sum of weighted spectral efficiencies of all UEs receiving superposition transmission using the conditional probabilities and normalized weighting coefficients of the all UEs; and determining the optimal power allocation for the UE by maximizing the sum of weighted spectral efficiencies.

According to yet another aspect of the present disclosure, an apparatus is provided for power allocation in a superposition multiple access communication system capable of using uniform and non-uniform superposition constellations (super-constellations), including at least one non-transitory computer-readable medium storing instructions capable of execution by a processor; and at least one processor capable of executing instructions stored on the at least one non-transitory computer-readable medium, where the execution of the instructions results in the apparatus performing a method including, for each receiver i receiving superposition multiple access transmission, calculating the conditional probability $P_{c,i}$ of a bit being correctly received based on its location within the super-constellation; for each receiver i receiving superposition multiple access transmission, calculating a normalized weighting coefficient $w_i$; calculating the sum S of weighted spectral efficiencies of all receivers i using the conditional probability $P_{c,i}$ and normalized weighting coefficient $w_i$ of each receiver i; and determining the optimal power allocation $\alpha^*_i$ for receiver i by maximizing the sum of weighted spectral efficiencies.

According to still yet another aspect of the present disclosure, a user equipment (UE) is provided, including at least one non-transitory computer-readable medium storing instructions capable of execution by a processor; and at least one processor capable of executing instructions stored on the at least one non-transitory computer-readable medium, where the execution of the instructions results in the UE performing a method including receiving an indication that superposition transmission is being used to transmit to the UE; receiving an indication of which type of superposition transmission is being used to transmit to the UE, wherein at least one type of superposition transmission uses a Gray-mapped Non-uniform-capable Constellation (GNC) super-constellation; and receiving one or more superposition transmission parameters, including information concerning power allocation for the UE, wherein the power allocation for the UE was determined by: calculating the conditional probability of a bit being correctly received by the UE based on its location within the super-constellation; calculating a normalized weighting coefficient for the UE; calculating the sum of weighted spectral efficiencies of all UEs receiving superposition transmission using the conditional probabilities and normalized weighting coefficients of the all UEs; and determining the optimal power allocation for the UE by maximizing the sum of weighted spectral efficiencies.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
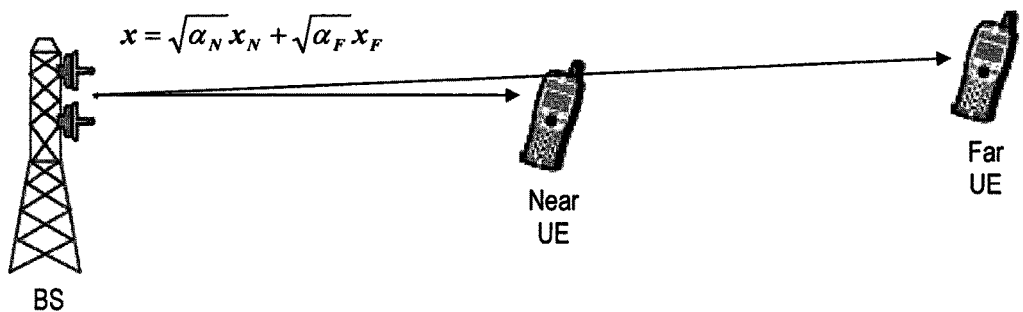
FIG. 1 is a diagram of an example of Multi-User Superposition Transmission (MUST), with both a near UE and a far UE sharing a superposed signal.
Figure 2:
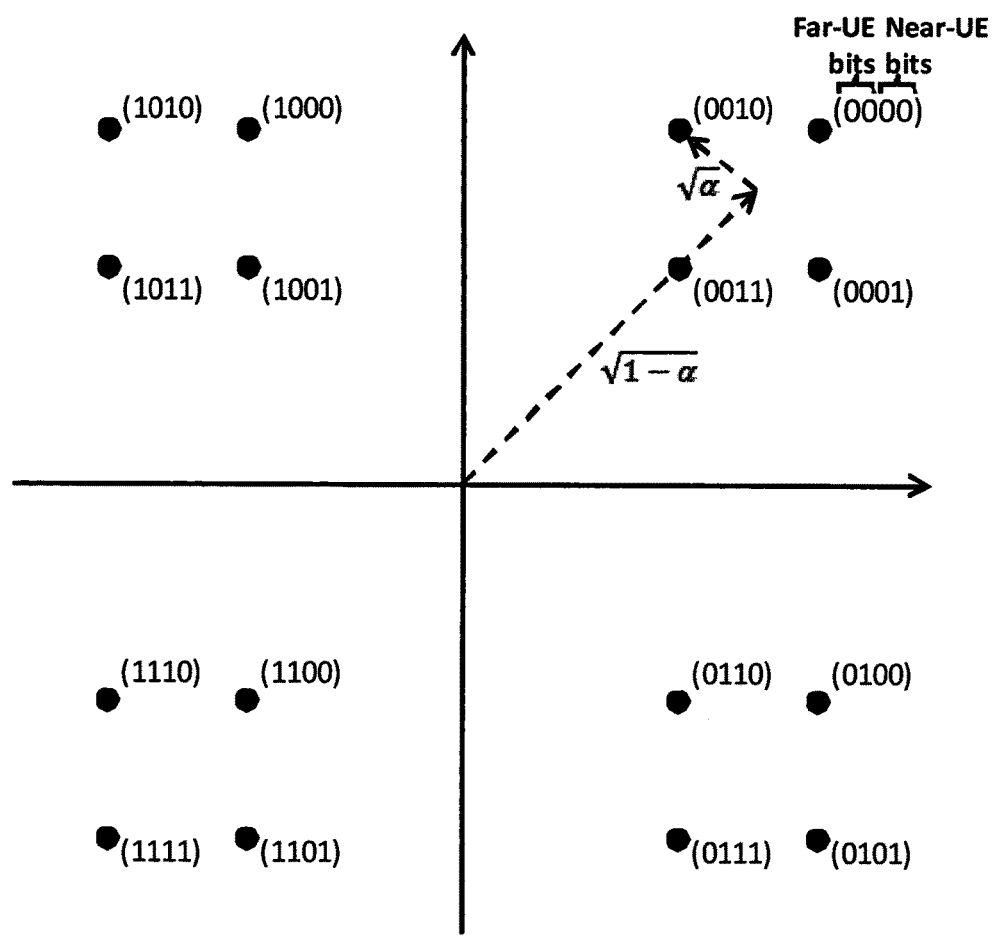
FIG. 2 is a mapping of a super-constellation formed by direct symbol mapping (DSM) of a (QPSK, QPSK) modulation pair for a far user and a near user.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although the terms including an ordinal number such as first, second, etc. may be used for describing various elements, the structural elements are not restricted by the terms.

The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of addition of one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

Broadly speaking, the present disclosure provides guidance, within a superposition multiple access communication context, on (1) how to split transmit power between near and far users using weighted spectral efficiencies; and (2) how to determine more detailed and more efficient bit-swapping rules.

Gray-Mapped Non-Uniform-Capable Constellation (GNC)

A related non-provisional patent application by the same inventors, entitled Apparatus and Method for Superposition Transmission, was filed on Jan. 15, 2016 and given U.S. application Ser. No. 14/997,106, and claims priority to the same four U.S. provisional patent applications as does the present application. That application is expressly incorporated by reference in its entirety.

In U.S. application Ser. No. 14/997,106 and similarly-incorporated U.S. Prov. Pat. App. Ser. No. 62/173,241 and 62/203,818 to which it claims priority (referred to jointly herein as "the other application"), a new type of superposition super-constellation is described: the Gray-mapped Non-uniform Constellation or Gray-mapped Non-uniform-capable Constellation (GNC). Besides being gray encoded, a GNC super-constellation can have unequal spaces between neighboring symbols (a feature which will be exploited herein), is formed by a direct-sum of regularly spaced lattices, which leads to simplified joint log-likelihood ratio (LLR) generation, and can be easily extended to more than two users (i.e., more than simply a "near" and a "far" user).

Among other things, the other application also discussed that Gray mapping may not be guaranteed under certain power-splitting conditions, although using a GNC super-constellation under some of those circumstances would still provide advantages over doing otherwise. Moreover, a "bit swapping" technique was discussed, where, under certain conditions, the bits of the near and far users are swapped within the GNC to provide better results. The specific results are summarized in Table 1 below:

TABLE 1

$\alpha_F$ Regions for GNC With and Without Bit-Swapping

| "Far" UE constellation ($2^{K_F}$)-QAM | "Near" UE constellation ($2^{K_N}$)-QAM | Resulting "Super-constellation" ($2^{K_F+K_N}$)-QAM | Bit-Swapped | Single Layer | Two Layers |
|---|---|---|---|---|---|
| QPSK | QPSK | 16-QAM | OFF | $\alpha_F \geq 0.5$ | $\alpha_F \geq 0.3333$ |
| | | | ON | $\alpha_F \leq 0.5$ | $\alpha_F \leq 0.3333$ |
| 16-QAM | QPSK | 64-QAM | OFF | $\alpha_F \geq 0.6429$ | $\alpha_F \geq 0.4737$ |
| | | | ON | $\alpha_F \leq 0.1667$ | $\alpha_F \leq 0.0909$ |
| QPSK | 16-QAM | 64-QAM | OFF | $\alpha_F \geq 0.8333$ | $\alpha_F \geq 0.7143$ |
| | | | ON | $\alpha_F \leq 0.3571$ | $\alpha_F \leq 0.2174$ |
| 16-QAM | 16-QAM | 256-QAM | OFF | $\alpha_F \geq 0.9$ | $\alpha_F \geq 0.8182$ |
| | | | ON | $\alpha_F \leq 0.1$ | $\alpha_F \leq 0.0526$ |
| 64-QAM | QPSK | 256-QAM | OFF | $\alpha_F \geq 0.7$ | $\alpha_F \geq 0.5385$ |
| | | | ON | $\alpha_F \leq 0.0455$ | $\alpha_F \leq 0.0233$ |
| QPSK | 64-QAM | 256-QAM | OFF | $\alpha_F \geq 0.9545$ | $\alpha_F \geq 0.9130$ |
| | | | ON | $\alpha_F \leq 0.3$ | $\alpha_F \leq 0.1795$ |

Thus, when forming a (16-QAM, QPSK) super-constellation in a single layer environment, if $\alpha_F \geq 0.6429$, a GNC with no bit-swapping should be used. If $\alpha_F \leq 0.1667$, a GNC with bit-swapping should be used. This means there is an "exclusion zone" between 0.1667 and 0.6429 where no GNC/bit-swapping combination works well, and other methods for generating super-constellations might be used there.

Although the other application provides guidance for defining exclusion zones and regions for performing bit-swapping or not, no further guidance is provided for optimization within those zones. In other words, for example, a single layer (16-QAM, QPSK) GNC with no bit-swapping should be used when $\alpha_F \geq 0.6429$, but the other application provides no guidance on the optimal value for $\alpha_F$ within that region.

This application provides guidance concerning the optimal power distribution and the optimal bit-swapping rules.

I. Optimal Power Distribution Using GNC with or without Bit-Swapping

Power distribution herein is optimized for GNC super-constellations by the use of weighted spectral efficiencies which take into account the modulation and coding schemes (MCS), symbol error rates, decoding error rates, and/or bias terms adjusting for coding gains and bit locations. In this embodiment, the sum of weighted spectral efficiencies is used, but, in other embodiments, other appropriate spectral efficiency metrics could be used, such as the weighted average of spectral efficiencies, for example.

Taking the simplest example, where there is only a near and a far user, only the inner bits of the super-constellation are of concern for the near user, while only the outer bits of the super-constellation are of concern to the far user. Thus, a single super-constellation provides two probabilities for a near or far user symbol being correct. For this situation, the sum of weighted spectral efficiencies is expressed for a near and far user as Equation (2)(a):

$$S = w_F P_{c,F} + w_N P_{c,N} \qquad (2)(a)$$

or more generally as $$S = \sum_{i=1}^{K} w_i P_{c,i}$$

for K users, where the probability $P_{c,i}$ of a detected symbol being correct is defined as Equation (2)(b):

$$P_{c,i} = \Sigma_{k=1}^{M} P(\hat{x}_{k,i} = x_{k,i}) \qquad (2)(b)$$

where $\hat{x}_{k,i}$ denotes the detected symbol at the kth symbol for user/UE i. Thus, $P_{c,i}$ handles uncoded rates. The code rate and its corresponding coding gains are captured with weighting coefficients. The maximum effective amount of bits to be carried on for user/UE i is expressed as $C_i \log_2 M_i$. Thus, the weighting coefficient for user/UE i, $W_i$, can be normalized with bias terms, as shown by Equation (2)(c):

$$w_i = \frac{c_i \log_2 M_i + \Delta_i(c_i, s_i)}{\sum_k (c_k \log_2 M_k + \Delta_k(c_k, s_k))} \qquad (2)(c)$$

where:

$C_i$ is the code rate for user/UEi;

$S_i$ is a flag indicating whether UE i's bits are swapped or not; and $\Delta_i(C_i, S_i)$ is a bias term to compensate for the effect of coding gains between inner and outer bits, and is a function of $C_i$ and $S_i$.

The bias term $\Delta_i(C_i, S_i)$ is needed because, although $C_i \log_2 M_i$ represents the maximum amount of bits that can be transmitted per symbol, the effective amount of bits to be carried are changed due to:

the effect of coding gains is not linear, and the bit location changes the effective coding gain.

In general, the outer bits are more robust than the inner bits such that the effective coding gain, even if at the same coding rate, can be different depending on bit position, which affects the block error rate (BLER). Accordingly, the bias term $\Delta_i(C_i, S_i)$ is added to compensate for both impacts on the bit domain. For example, if the same MCS is used for both the far and near user, additional bits would be added to the near user's $\Delta_i(C_i, S_i)$ to balance the performance. As another example, a high code rate having less decoding gains would need a high $\Delta_i(C_i, S_i)$ to compensate for the effect on the bit positions.

The bias terms $\Delta_i(C_i, S_i)$ could be prepared offline and saved as a lookup table (LUT). The optimal $\alpha^*_F$ to maximize the sum of weighted spectral efficiencies for both users/UEs can be calculated generally by Equation (3), as will be shown in detail below:

$$\alpha^*_F = \arg\max_{\alpha_F = \alpha_{F,th}} S \qquad (3)$$

where $\alpha_{F,th}$ follows Table 1 above, and is determined depending on the modulation combination. For example, when a single stream is used with no-swapping, then $\alpha_{F,th}$ should be 0.5 with (QPSK, QPSK) as shown in the first column in Table 1.

Since C is changed with the signal-to-noise ratio (SNR), the power distribution coefficient $\alpha^*_F$ varies in a corresponding manner and, as mentioned above, it would vary depending on whether bit-swapping was used. Lastly, $P_{c,i}$ depends on using the GNC system as described here and in the other application.

As discussed further below, the idea of using weighted spectral efficiencies could be extended to a scheme using codeword level decoding.

A. Optimal $\alpha_F$ for (QPSK, QPSK) GNC Super-Constellation (1) Uniform (QPSK, QPSK) GNC (FIG. 3A)

Figure 3A:
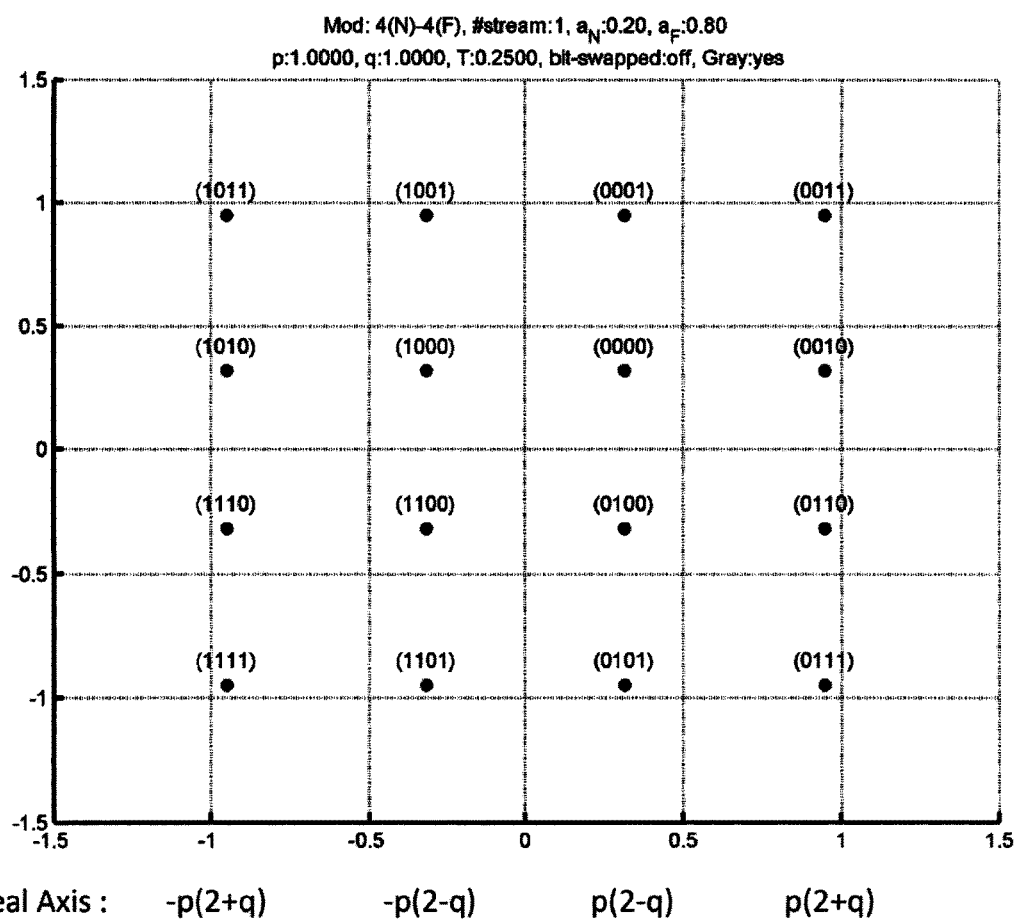
FIG. 3A is the mapping of a special case of Gray-mapped Non-uniform-capable Constellation (GNC) for a (QPSK, QPSK) modulation pair where the lattice is uniform, according to an embodiment of the present disclosure.

To explain the idea, consider FIG. 3A, which is a single-layer (QPSK, QPSK) GNC super-constellation where $\alpha_N = 0.20$ and $\alpha_F = 0.80$ or, equivalently, p=q=1. The parameters q and p mentioned above are new variables used for generating the GNC super-constellation, as discussed in more detail in the other application. Generally speaking, q guarantees the desired power split between the users and p relates to unit constellation power.

Figure 3B:
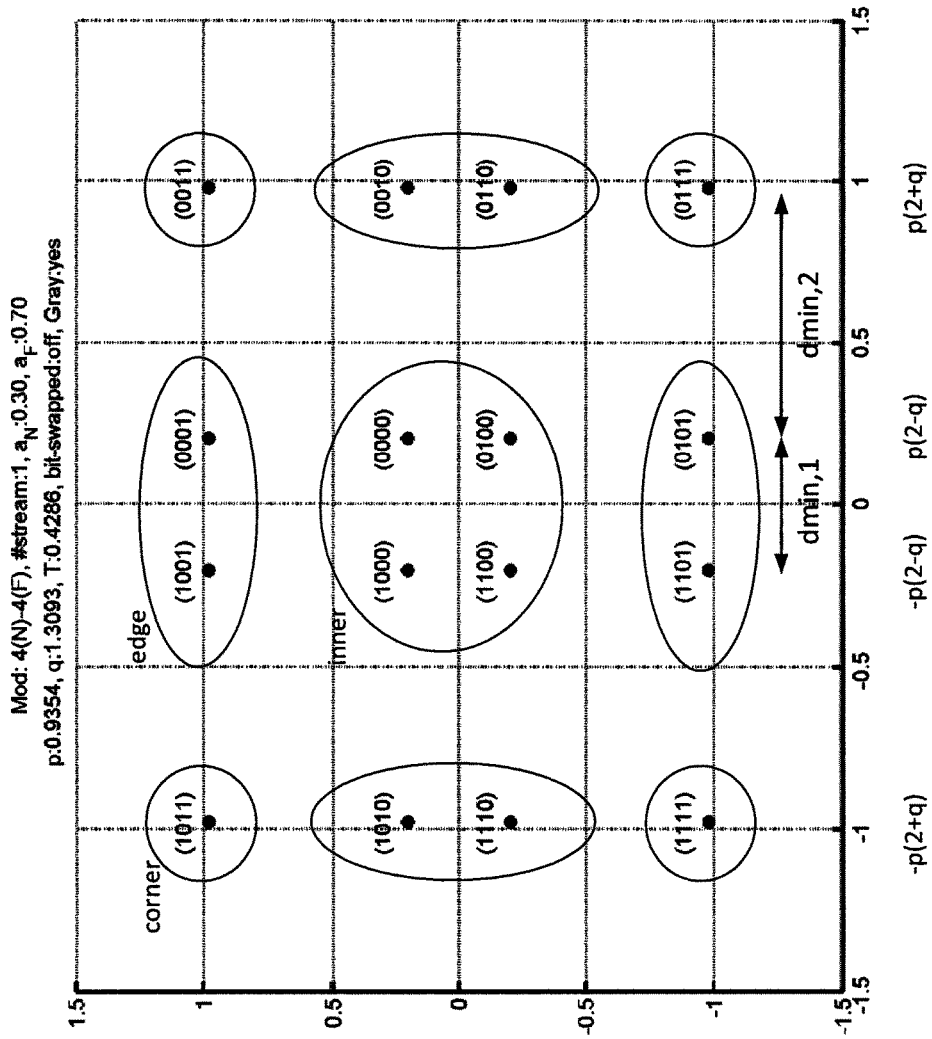
FIG. 3B is the mapping of a non-uniform GNC for a (QPSK, QPSK) modulation pair according to various embodiments of the present disclosure.

FIG. 3A is a special case, where the GNC super-constellation forms a uniform 16-QAM lattice (instead of a non-uniform lattice, as discussed below in reference to FIG. 3B). Uniform or not, the four feasible real values for the points are $-p(2+q)$, $-p(2-q)$, $p(2-q)$, and $p(2+q)$, as shown in FIGS. 3A and 3B, and the values on the imaginary axis are symmetric to these real values.

In FIG. 3A, bits $(b_0, b_1)$ divide the constellation into four groups, where each group belongs in one quadrant in the $(x_1, x_Q)$ coordinate system. Bits $(b_2, b_3)$ define Gray labeled constellation points with each set for a given value of the pair $(b_0, b_1)$. In other words, the pairs of bits $(b_0, b_1)$ and $(b_2, b_3)$ form a nested structure where $(b_0, b_1)$ constitute the "outer" part of the direct sum and $(b_2, b_3)$ form the "inner" part of the direct sum, as shown in Equation (4).

$$(b_0, b_1, b_2, b_3) = \underbrace{(b_0, b_1)}_{\text{(outer part)}} \oplus \underbrace{(b_2, b_3)}_{\text{(inner part)}} \qquad (4)$$

The outer bits are assigned to the far user, $(b_0, b_1) = (d_0^F d_1^F)$, and the inner bits are assigned to the near user, $(b_2, b_3) = (d_0^N d_1^N)$. Assuming the received power is P, and the power constraint value C is 10/P, the unequal power split can be made part of symbol mapping as shown in Equations (5)(a) and (5)(b) below:

$$x = \frac{1}{\sqrt{C}} \{p(1-2b_0)[2-q(1-2b_2)] + jp(1-2b_1)[2-q(1-2b_3)]\} \qquad (5)(a)$$

which is the same as $$x = \qquad (5)(b)$$
$$\frac{1}{\sqrt{C}} \{p(1-2d_0^F)[2-q(1-2d_0^N)] + jp(1-2d_1^F)[2-q(1-2d_1^N)]\}$$

where p and q are positive real-valued numbers, as mentioned above, which, when in a one-layer or scalar environment (or "Scenario 1" as established by 3GPP RAN1 to evaluate MUST), are subject to the following constraints:

$$2p^2(4+q^2) = C \quad (6)(a)$$

$$\frac{q^2}{4} = \frac{1-\alpha_F}{\alpha_F} \quad (6)(b)$$

where Equation (6)(a) arises from the total power requirement or unit constellation power and Equation (6)(b) arises from the power split requirement between the near and far users, or, equivalently, the split between the ($b_0$, $b_1$) bits and ($b_2$, $b_3$) bits.

As discussed above, FIG. 3A is the special case of (QPSK, QPSK) GNC super-constellation where $\alpha_N$=0.20 and $\alpha_F$=0.80 or, equivalently, p=q=1, thereby forming a uniform 16-QAM lattice.

(2) Non-uniform (QPSK,QPSK) GNC (FIG. 3B)

FIG. 3B is a non-uniform (QPSK, QPSK) GNC super-constellation having unequal distances between constellation points. Specifically, the non-uniform GNC super-constellation as shown in FIG. 3B has two different values for the distance between symbols, which are:

$$d_{min,1} = 2p(2-q) \quad (7)(a)$$

$$d_{min,2} = 2pq \quad (7)(b)$$

For simplicity, the nearest neighbor symbols can only be considered to pick erroneous symbols up. As the distance increases, the error probability exponentially decreases. In addition, as SNR increases, the value of Q function significantly decreases. Thus, other symbols except for the nearest neighbor symbols would have small impact on the proposed power allocation.

In general, constellation points may be grouped in a number of ways in terms of defining the conditional probability, such as shown in the particular example of Equation (8)(a) below, as would be understood by one of ordinary skill in the art. Points within the same distance and having the same number of different bits could be grouped, for example.

For a far user bit (which is also an outer bit, like all far user bits), the conditional probability of being correct is given by Equation (8)(a):

$$P(\hat{x}_{k,F} = x_{k,F} | x_F = x_{k,F}) = \begin{cases} 1 & \text{if } x_k \text{ is one of 4 corner points} \\ (1-Q_1)^2 & \text{if } x_k \text{ is one of 4 inner points} \\ (1-Q_1) & \text{if } x_k \text{ is one of 8 edge points} \end{cases} \quad (8)(a)$$

where $Q_i$ is defined as a Q-function $$Q(x) = \frac{1}{\sqrt{2\pi}} \int_x^\infty \exp\left(-\frac{u^2}{2}\right) du$$

with the argument $d_{min,i}/2\sigma$. The Q-function indicates the tail probability of the standard normal distribution. Thus, Equation (8)(a) can be re-written as Equation (8)(b):

$$P_{c,F} = P(\hat{x}_F = x_F) = \frac{8}{16}(1-Q_1) + \frac{4}{16}(1-Q_1)^2 + \frac{4}{16} \quad (8)(b)$$

For a near user bit (which is also an inner bit, like all near user bits), the conditional probability of being correct is given by Equation (9)(a):

$$P(\hat{x}_{k,N} = x_{k,N} | x_N = x_{k,N}) = (1-Q_2)^2 \quad (9)(a)$$

for all points in the super-constellation. Since each constellation point is also uniformly selected, the conditional probability can also be given by Equation (9)(b):

$$P_{c,N} = P(\hat{x}_N = x_N) = (1-Q_2)^2 \quad (9)(b)$$

Therefore, the sum of weighted spectral efficiencies for the (QPSK, QPSK) GNC super-constellation is given by applying Equation (2)(a) to the case of a near and far user, as shown in Equation (10):

$$S = w_F P_{c,F} + w_N P_{c,N} \quad (10)$$

$$= w_F\left(\frac{1}{2}(1-Q_1) + \frac{1}{4}(1-Q_1)^2 + \frac{1}{4}\right) + w_N(1-Q_2)^2$$

where ($w_F$, $w_N$) is a set of normalizing weighting coefficients as in Equation (2)(c). The optimal $\alpha^*_F$ to maximize the sum of weighted spectral efficiencies for both users/UEs can be selected by Equation (11)(a):

$$\alpha^*_F = \arg\max_{\alpha_F \approx 0.5} S \quad (11)(a)$$

Since the combination of (QPSK, QPSK) is symmetric over bit-swapping, the optimal $\alpha^*_F$ for the bit-swapped GNC, denoted as $\alpha^{-*}_F$, is given by Equation (11)(b):

$$\alpha^{-*}_F = 1 - \alpha^*_F \quad (11)(b)$$

B. Optimal $\alpha_F$ for (16-QAM, QPSK) GNC Super-Constellation (FIG. 4)

Figure 4:
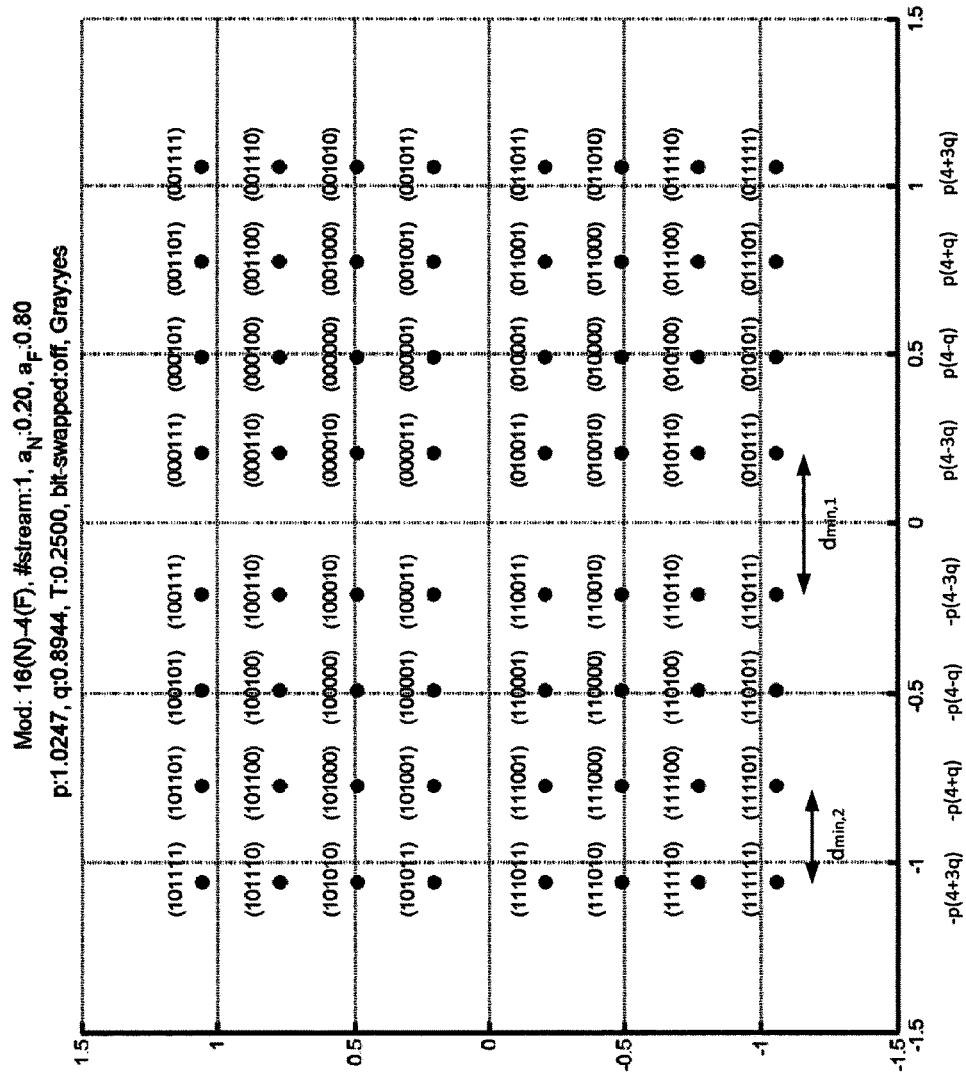
FIG. 4 is a mapping of a (16-QAM, QPSK) GNC super-constellation according to an embodiment of the present disclosure.

FIG. 4 shows a single-layer (16-QAM, QPSK) GNC super-constellation with no bit-swapping, where $\alpha_N$=0.20 and $\alpha_F$=0.80, for which the optimal power distribution is derived below according to an embodiment of the present disclosure in terms of the sums of spectral efficiencies. The real parts of the symbol mapping are identified in terms of p and q at the bottom of FIG. 4.

The bit assignment is ($b_0$, $b_1$, $b_2$, $b_3$, $b_4$, $b_5$)=($d_0^F$, $d_1^F$, $d_0^N$, $d_1^N$, $d_2^N$, $d_3^N$) (except when the bits are swapped). When the received power is P, the power constraint value C is 42/P, and the symbol mapping process is as shown in Equation (12) below:

$$x = \frac{1}{\sqrt{C}}(1-2b_0)p(4-q(1-2b_2)(2-(1-2b_4))) + j\frac{1}{\sqrt{C}}(1-2b_1)p(4-q(1-2b_3)(2-(1-2b_5))) \quad (12)$$

which generates four positive real values: p(4−3q), p(4−q), p(4+q), and p(4+3q). In a one-layer or scalar environment (or "Scenario 1" as established by 3GPP RAN1 to evaluate MUST), p, q are subject to the following constraints:

$$2p^2(16+5q^2) = C \quad (13)(a)$$

$$\frac{10q^2}{32} = \frac{1-\alpha_F}{\alpha_F} \quad (13)(b)$$

where again the former comes from the total power requirement/unit constellation power and the latter arises from the power split requirement between the near and far users. Note that setting p=q=1 or equivalently $\alpha_F$=20/21 results in the uniform 64-QAM constellation.

Contrary to the uniform constellation, the non-uniform GNC super-constellation as shown in FIG. 4 has two different values for the distance between symbols, which are:

$$d_{min,1} = 2p(4-3q) \tag{14)(a}$$

$$d_{min,2} = 2pq \tag{14)(b}$$

For a far user, the conditional probability of being correct can be listed as Equation (15)(a):

$$P(\hat{x}_{k,F} = x_{k,F} | x_F = x_{k,F}) = \tag{15)(a}$$

$$\begin{cases} (1-Q_1) & \text{if } x_k \text{ is one of 24 edge/inner points} \\ (1-Q_1)^2 & \text{if } x_k \text{ is one of 4 inner points} \\ 1 & \text{if } x_k \text{ is one of 36 outer points} \end{cases}$$

which only takes the nearest neighbor symbols into account. Each symbol is equally selected with a probability 1/64 such that the probability of being correct can be calculated as:

$$P_{c,F} = P(\hat{x}_F = x_F) = \frac{3}{8}(1-Q_1) + \frac{1}{16}(1-Q_1)^2 + \frac{9}{16} \tag{15)(b}$$

The conditional probability for the far user can be re-listed, using the additional distances of:

$$d_{min,3} = 2d_{min,1} + d_{min,2} \tag{15)(c}$$

$$d_{min,4} = d_{min,1} + 2d_{min,2} \tag{15)(d}$$

to arrive at Equation (15)(e):

$$P(\hat{x}_{k,F} = x_{k,F} | x_F = x_{k,F}) = \tag{15)(e}$$

$$\begin{cases} (1-Q_1) & \text{if } x_k \text{ is one of 16 edge/inner points} \\ (1-Q_1)(1-Q_4) & \text{if } x_k \text{ is one of 8 out/inner points} \\ (1-Q_1)^2 & \text{if } x_k \text{ is one of 4 inner points} \\ (1-Q_4) & \text{if } x_k \text{ is one of 16 out/inner points} \\ (1-Q_4)^2 & \text{if } x_k \text{ is one of 4 out/inner points} \\ 1 & \text{if } x_k \text{ is one of 16 outer points} \end{cases}$$

which updates Equation (15)(b) to Equation (15)(f):

$$P_{c,F} = P(\hat{x}_F = x_F) \tag{15)(f}$$

$$= \frac{1}{4}(1-Q_1) + \frac{1}{8}(1-Q_1)(1-Q_4) + \frac{1}{16}(1-Q_1)^2 +$$

$$\frac{1}{4}(1-Q_4) + \frac{1}{16}(1-Q_4)^2 + \frac{1}{4}$$

For the near user, the conditional probability of being correct can be listed as Equation (16)(a):

$$P(\hat{x}_{k,N} = x_{k,N} | x_N = x_{k,N}) = \tag{16)(a}$$

$$\begin{cases} (1-Q_2)^2 & \text{if } x_k \text{ is one of 4 corner/4 inner/} \\ & \phantom{xx} 8 \text{ edge points} \\ (1-2Q_2)(1-Q_2) & \text{if } x_k \text{ is one of 32 edge/inner points} \\ (1-2Q_2)^2 & \text{if } x_k \text{ is one of 16 out-inner points} \end{cases}$$

for all points on a uniform constellation map. Similarly, the probability of being correct can be calculated as:

$$P_{c,N} = P(\hat{x}_N = x_N) \tag{16)(b}$$

$$= \frac{1}{4}(1-Q_2)^2 + \frac{1}{2}(1-2Q_2)(1-Q_2) + \frac{1}{4}(1-2Q_2)^2$$

The conditional probability for the near user can be re-listed, using the additional distance of $d_{min,3}$ to Equation (16)(c):

$$P(\hat{x}_{k,N} = x_{k,N} | x_N = x_{k,N}) = \tag{16)(c}$$

$$\begin{cases} (1-Q_2)^2 & \text{if } x_k \text{ is one of 4 corner points} \\ (1-Q_2)(1-2Q_2) & \text{if } x_k \text{ is one of 16 edge/inner points} \\ (1-2Q_2)^2 & \text{if } x_k \text{ is one of 16 out/inner points} \\ (1-Q_2)(1-Q_2-Q_3) & \text{if } x_k \text{ is one of 8 edge/inner points} \\ (1-2Q_2)(1-Q_2-Q_3) & \text{if } x_k \text{ is one of 16 out/inner points} \\ (1-Q_2-Q_3)^2 & \text{if } x_k \text{ is one of 4 inner points} \end{cases}$$

which updates Equation (16)(b) to Equation (16)(d):

$$P_{c,N} = P(\hat{x}_N = x_N) \tag{16)(d}$$

$$= \frac{1}{16}(1-Q_2)^2 + \frac{1}{4}(1-Q_2)(1-2Q_2) + \frac{1}{4}(1-2Q_2)^2 +$$

$$\frac{1}{8}(1-Q_2)(1-Q_2-Q_3) + \frac{1}{4}(1-2Q_2)(1-Q_2-Q_3) +$$

$$\frac{1}{16}(1-Q_2-Q_3)^2$$

Therefore, the sum of weighted spectral efficiencies for the (16-QAM, QPSK) GNC super-constellation is Equation (17):

$$S = w_F P_{c,F} + w_N P_{c,N} \tag{17}$$

$$= w_F \left( \frac{3}{4}(1-Q_1) + \frac{1}{8}(1-Q_1)^2 \right) +$$

$$w_N \left( \frac{1}{4}(1-Q_2)^2 + \frac{1}{2}(1-2Q_2)(1-Q_2) + \frac{1}{4}(1-2Q_2)^2 \right)$$

where ($w_F$, $w_N$) is a set of normalizing weighting coefficient as in Equation (5)(c). Alternatively, it could be updated by using Equation (15)(e) or (16)(d) Thus, the optimal $\alpha^*_F$ for the (16-QAM, QPSK) GNC super-constellation can be selected as Equation (18):

$$\alpha^*_F = \arg\max_{\alpha_F = 0.65} S \tag{18}$$

C. Optimal $\alpha_F$ for (QPSK, 16-QAM) GNC Super-Constellation (FIG. 5)

Figure 5:
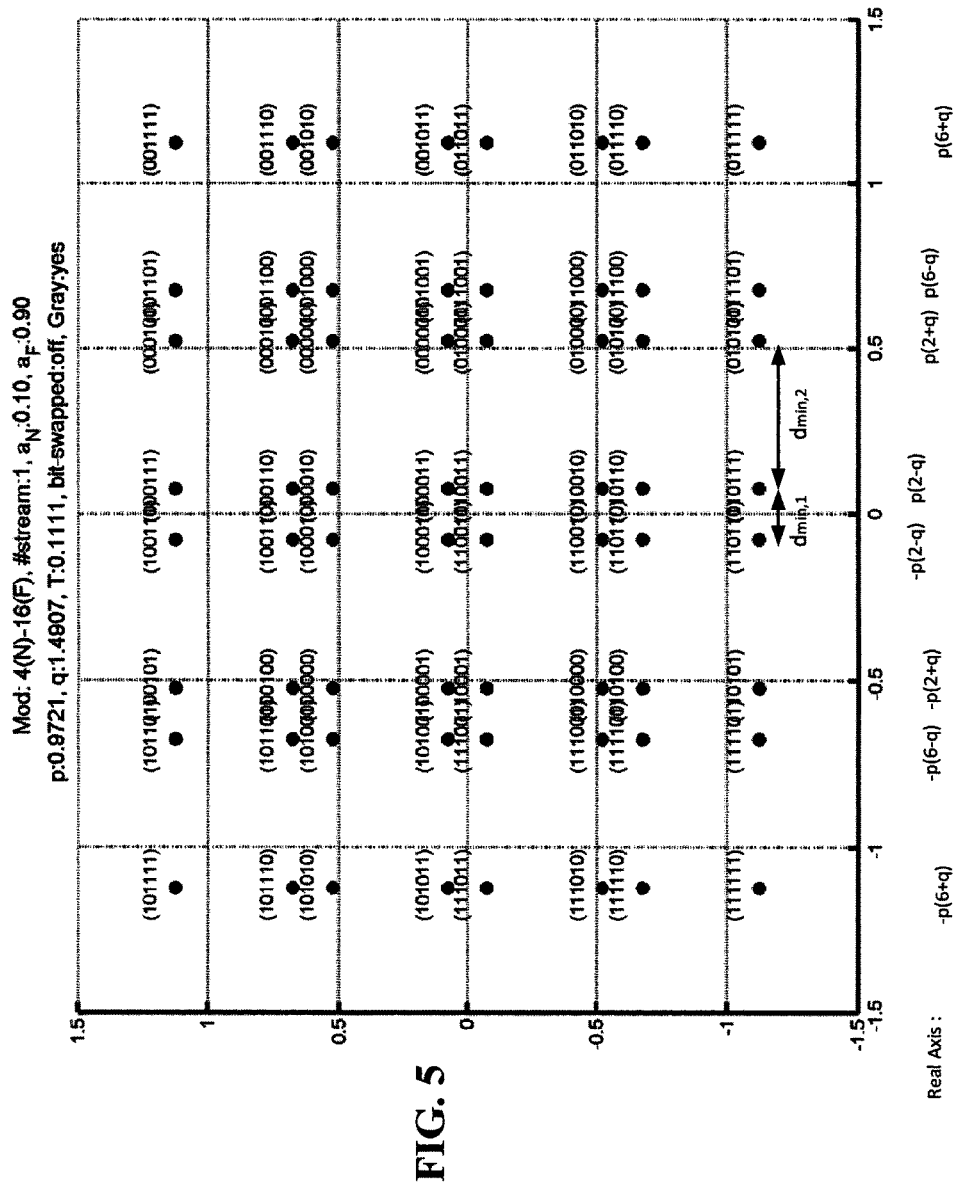
FIG. 5 is a mapping of a (QPSK, 16-QAM) GNC super-constellation according to an embodiment of the present disclosure.

FIG. 5 shows a (QPSK, 16-QAM) GNC super-constellation with no bit-swapping, where $\alpha_F$=0.90. Its optimal power distribution in terms of the sums of spectral efficiencies is derived below according to an embodiment of the present disclosure.

The outer bits and the inner bits are positioned for the far user and the near user, respectively. Thus, 6 bits per symbol are concatenated to $(b_0, b_1, b_2, b_3, b_4, b_5)=(d_0^F, d_1^F, d_2^F, d_3^F, d_0^N, d_1^N)$, and each symbol is mapped with p and q to Equation (19):

$$x = \frac{1}{\sqrt{C}}(1-2b_0)p(4-(1-2b_2)(2-q(1-2b_4))) + \qquad (19)$$
$$j\frac{1}{\sqrt{C}}(1-2b_1)p(4-(1-2b_3)(2-q(1-2b_5)))$$

where C=42 for the unit power constraint. When the received power is P, the power constraint value C is 42/P. For $N_s$=1, p, q are subject to the following constraints:

$$2p^2(20+q^2) = C \qquad (20)(a)$$

$$\frac{q^2}{20} = \frac{1-\alpha_F}{\alpha_F} \qquad (20)(b)$$

As mentioned above, the power distribution between $\alpha_N$ and $\alpha_F$ is determined by q. Note that setting p=q=1 or equivalently $\alpha_F$=16/21 results in the uniform 64-QAM constellation. As shown by FIG. 5, the two different distances between symbols are:

$$d_{min,1}=2p(2-q) \qquad (21)(a)$$

$$d_{min,2}=2pq \qquad (21)(b)$$

which are used to derive an error rate for both the far and near users/UEs, respectively.

For a far user, the conditional probability of being correct with the nearest neighbor symbols can be listed as Equation (22)(a):

$$P(\hat{x}_{k,F} = x_{k,F} | x_F = x_{x,F}) = \qquad (22)(a)$$
$$\begin{cases} (1-Q_1)^2 & \text{if } x_k \text{ is one of 36 inner points} \\ (1-Q_1) & \text{if } x_k \text{ is one of 24 edge points} \\ 1 & \text{if } x_k \text{ is one of 4 corner points} \end{cases}$$

such that the probability of being correct is given by:

$$P_{c,F} = P(\hat{x}_F = x_F) = \frac{3}{8}(1-Q_1) + \frac{9}{16}(1-Q_1)^2 + \frac{1}{16} \qquad (22)(b)$$

and, given the 3$^{rd}$ and 4$^{th}$ distances of:

$$d_{min,3}=2d_{min,1}+d_{min,2} \qquad (22)(c)$$

$$d_{min,4}=d_{min,1}+2d_{min,2} \qquad (22)(d)$$

the conditional probability for the far user can be elaborated as:

$$P(\hat{x}_{k,F} = x_{k,F} | x_F = x_{x,F}) = \qquad (22)(e)$$
$$\begin{cases} (1-Q_4)^2 & \text{if } x_k \text{ is one of 4 corner points} \\ (1-Q_1)(1-Q_4) & \text{if } x_k \text{ is one of 8 edge points} \\ (1-Q_1-Q_4)(1-Q_4) & \text{if } x_k \text{ is one of 16 edge points} \\ (1-Q_1)^2 & \text{if } x_k \text{ is one of 4 inner points} \\ (1-Q_1)(1-Q_1-Q_4) & \text{if } x_k \text{ is one of 16 inner points} \\ (1-Q_1-Q_4)^2 & \text{if } x_k \text{ is one of 16 inner points} \end{cases}$$

which updates the conditional probability of Equation (22)(b) to Equation (22)(f):

$$P_{c,F} = P(\hat{x}_F = x_F) \qquad (22)(f)$$
$$= \frac{1}{16}(1-Q_4)^2 + \frac{1}{8}(1-Q_1)(1-Q_4) +$$
$$\frac{1}{4}(1-Q_1-Q_4)(1-Q_4) +$$
$$\frac{1}{16}(1-Q_1)^2 + \frac{1}{4}(1-Q_1)(1-Q_1-Q_4) + \frac{1}{4}(1-Q_1-Q_4)^2$$

For a near user, the conditional probability of being correct is given by Equation (23)(a):

$$P(\hat{x}_{k,N}=x_{k,N}|x_N=x_{k,N})=(1-Q_2)^2 \qquad (23)(a)$$

for all points on a uniform constellation map. All points are assigned with an equal probability so that:

$$P_{c,N}=P(\hat{x}_N=x_N)=(1-Q_2)^2 \qquad (23)(b)$$

as with the far user, the conditional probability for the near user can be elaborated with $Q_3$ as:

$$P(\hat{x}_{k,N} = x_{k,N} | x_N = x_{x,N}) = \qquad (23)(c)$$
$$\begin{cases} (1-Q_2)^2 & \text{if } x_k \text{ is one of 4 corner points} \\ (1-Q_2)(1-Q_2-Q_3) & \text{if } x_k \text{ is one of 24 edge points} \\ (1-Q_2-Q_3)^2 & \text{if } x_k \text{ is one of 36 inner points} \end{cases}$$

which updates Equation (23)(b) to Equation (23)(d):

$$P_{c,N} = P(\hat{x}_N = x_N) \qquad (23)(d)$$
$$= \frac{1}{16}(1-Q_2)^2 + \frac{3}{8}(1-Q_2)(1-Q_2-Q_3) + \frac{9}{16}(1-Q_2-Q_3)^2$$

Therefore, the sum of weighted spectral efficiencies for the (QPSK, 16-QAM) GNC super-constellation is Equation (24):

$$S = w_F P_{c,F} + w_N P_{c,N} \qquad (24)$$
$$= w_F\left(\frac{3}{8}(1-Q_1) + \frac{9}{16}(1-Q_1)^2 + \frac{1}{16}\right) + w_N((1-Q_2)^2)$$

where ($w_F$, $w_N$) is a set of normalizing weighting coefficient as in Equation (5)(c). Alternatively, it could be updated by using Equation (22)(f) or (23)(d) Thus, the optimal $\alpha^*_F$ for the (QPSK, 16-QAM) GNC super-constellation can be selected as Equation (25)(a):

$$\alpha^*_F = \arg\max_{\alpha_F=0.84} S \qquad (25)(a)$$

If there is bit-swapping, $\alpha_N$ and $\alpha_F$ are switched, and so are the weighting coefficients. Accordingly, the optimal $\alpha^{-*}{}_F$ for the bit-swapped GNC is given by Equation (25)(b):

$$\alpha^{-*}{}_F = \mathrm{argmax}_{\alpha_F \leq 0.35} S \tag{25)(b}$$

D. Extension from Symbol to Codeword

As mentioned above, the idea of using weighted spectral efficiencies could be extended to a scheme using codeword level decoding. More specifically, Equation (26)(a) below could be used:

$$S = \tilde{w}_N P_{cw,\{c,N\}} + \tilde{w}_F P_{cw,\{c,F\}} \tag{26)(a}$$

where $P_{cw,\{c,i\}}$ is the codeword probability of being correctly decoded for UE i. This could be empirically measured at a system level, or estimated by using a Mean Mutual Information per coded Bit (MMIB) mapping method. The MUST scheduler should consider several power distributions, MCSs, and RB allocations for each UE. The normalized weighting coefficients could be changed to Equation (26)(b):

$$\tilde{w}_i = \frac{c_i + \Delta_i(c_i, s_i)}{\Sigma_k (c_k + \Delta_k(c_k, s_k))} \tag{26)(b}$$

II. Bit-Swapping Rules when Using GNC

This section tabulates a decision rule for bit-swapping when using superposition multiple access communication. Except for the (QPSK, QPSK) super-constellation, Gray mapping cannot be guaranteed for all power distribution sets. In those cases, bit swapping may be used to restore Gray mapping. However, this means a determination must be made at transmission about whether to bit-swap or not. In this section, a table of decision parameters is generated according to an embodiment of the present invention. Below, the bit-swapping conditions are considered for each super-constellation. A table at the end summarizes the results.

A. Bit-Swapping Conditions for (16-QAM, QPSK) GNC Super-Constellation

In a (16-QAM, QPSK) GNC super-constellation, such as FIG. 4, this first condition is needed to ensure Gray mapping:

$$p(4-3q) \geq -p(4-3q) \tag{27)(a}$$

which generates the first threshold: $\alpha_{F,1} = 0.6429$. The second condition is:

$$p(4-q) \geq -p(4-3q) \tag{27)(b}$$

which generates the second threshold: $\alpha_{F,2} = 0.4444$. The last threshold is the bit-swapping threshold $\alpha_{F,3} = 0.1667$. These sets of thresholds determine how much an individual constellation for each UE could be overlapped in a joint/super constellation map for both UEs. In practice, performance could be affected by coding gains and bit-locations of bit-loading. Because of this, $\alpha_{F,2}$ may be adjusted by $\Delta$, i.e., $\alpha_{F,2} + \Delta$ (which will be seen in Table 2 at the end of this section). This, of course, applies to all super-constellations.

B. Bit-Swapping Conditions for (QPSK, 16-QAM) GNC Super-Constellation

In a (QPSK, 16-QAM) GNC super-constellation, such as FIG. 5, the first Gray mapping condition is:

$$p(2-q) \geq -p(2-q) \tag{28)(a}$$

which generates the first threshold: $\alpha_{F,1} = 0.8333$. The second Gray mapping condition is:

$$p(2-q) \geq -p(6-q) \tag{28)(b}$$

which generates the second threshold: $\alpha_{F,2} = 0.5556$. The last threshold is the bit-swapping threshold $\alpha_{F,3} = 0.3571$. These sets of thresholds indicate the level of single constellation's overlap in a joint constellation map.

C. Bit-Swapping Conditions for (16-QAM, 16-QAM) GNC Super-Constellation

For the (16-QAM, 16-QAM) GNC super-constellation, the feasible x values can be represented with p and q as $p(12+3q)$, $p(12+q)$, $p(12-q)$, $p(12-3q)$, $p(4+3q)$, $p(4+q)$, $p(4-q)$, and $p(4-3q)$ on the positive axis. Thus, Gray mapping holds if the following condition is valid:

$$-p(4-3q) \geq p(4-3q) \tag{29)(a}$$

which generates the first threshold: $\alpha_{F,1} = 0.9$. As $\alpha_F$ decreases, some of the constellation points overlap each other. When the condition indicated by Equation (29)(b) below is met, more than a half of the symbol points in an individual constellation are overlapped with the other individual constellation for co-scheduled UEs in a joint/super constellation map:

$$-p(4-3q) \geq p(12-3q) \tag{29)(b}$$

which generates the inequality for second threshold: $\alpha_{F,2} \geq 0.6923$. The last threshold is the bit-swapping threshold $\alpha_{F,3} = 0.1$.

D. Bit-Swapping Conditions for (64-QAM, QPSK) GNC Super-Constellation

For the (64-QAM, QPSK) GNC super-constellation, the feasible x values can be represented with p and q as $p(8+7q)$, $p(8+5q)$, $p(8+3q)$, $p(8+q)$, $p(8-q)$, $p(8-3q)$, $p(8-5q)$, and $p(8-7q)$ on the positive axis. Thus, Gray mapping holds if the following condition is valid:

$$-p(8-7q) \geq p(8-7q) \tag{30)(a}$$

which generates the first threshold: $\alpha_{F,1} = 0.7$. As $\alpha_F$ decreases, some of the constellation points overlap each other. Then, more than a half of the symbol points in an individual constellation will overlap with the other individual constellation for co-scheduled UEs in a joint/super constellation map if the conditions of Equations (30)(b) and (30)(c) are met:

$$-p(8-7q) \geq p(8-q) \tag{30)(b}$$

$$-p(8-7q) \leq p(8+q) \tag{30)(c}$$

which generates the second threshold: $0.3 \leq \alpha_{F,2} \leq 0.4324$. $\alpha_{F,2}$ is expected to be in this range, with its exact position within the range depending on coding gains and bit locations. The bit-swapping threshold is $\alpha_{F,3} = 0.0455$.

E. Bit-Swapping Conditions for (QPSK, 64-QAM) GNC Super-Constellation

For the (QPSK, 64-QAM) GNC super-constellation, the feasible x values can be represented with p and q as $p(14+q)$, $p(14-q)$, $p(10+q)$, $p(10-q)$, $p(6+q)$, $p(6-q)$, $p(2+q)$, and $p(2-q)$ on the positive axis. Thus, Gray mapping holds if the following condition is valid:

$$-p(2-q) \geq p(2+q) \tag{31)(a}$$

which generates the first threshold: $\alpha_{F,1} = 0.9545$. As $\alpha_F$ decreases, some of the constellation points overlap each other. Then, more than a half of the symbol points in an individual constellation will overlap with the other individual constellation for co-scheduled UEs in a joint/super constellation map if Equation (31)(b) is met:

$$-p(2-q) \geq p(10-q) \tag{31)(b}$$

which generates the second threshold: $\alpha_{F,2} = 0.7$. The bit-swapping threshold is $\alpha_{F,3} = 0.3$.

F. Summary of Bit-Swapping Conditions

The above results are summarized in Table 2 below:

TABLE 2

Decision Rule whether to Bit-Swap

| (Near, Far) | | Bit-Swapped |
|---|---|---|
| (16QAM, QPSK) | $0.6429 \leq \alpha_F \leq 1.0000$ | OFF (Gray) |
| | $0.4444 + \Delta \leq \alpha_F \leq 0.6429$ | OFF |
| | $0.1667 \leq \alpha_F \leq 0.4444 + \Delta$ | ON |
| | $0.0000 \leq \alpha_F \leq 0.1667$ | ON (Gray) |
| (QPSK, 16QAM) | $0.8333 \leq \alpha_F \leq 1.0000$ | OFF (Gray) |
| | $0.5556 + \Delta \leq \alpha_F \leq 0.8333$ | OFF |
| | $0.3571 + \Delta \leq \alpha_F \leq 0.5556 + \Delta$ | ON |
| | $0.0000 \leq \alpha_F \leq 0.3571$ | ON (Gray) |
| (16QAM, 16QAM) | $0.9000 \leq \alpha_F \leq 1.0000$ | OFF (Gray) |
| | $0.6923 + \Delta \leq \alpha_F \leq 0.9000$ | OFF |
| | $0.1000 + \Delta \leq \alpha_F \leq 0.6923 + \Delta$ | ON |
| | $0.0000 \leq \alpha_F \leq 0.1000$ | ON (Gray) |
| (64QAM, QPSK) | $0.7000 \leq \alpha_F \leq 1.0000$ | OFF (Gray) |
| | $0.4324 + \Delta \leq \alpha_F \leq 0.7000$ | OFF |
| | $0.0455 + \Delta \leq \alpha_F \leq 0.4324 + \Delta$ | ON |
| | $0.0000 \leq \alpha_F \leq 0.0455$ | ON (Gray) |
| (QPSK, 64QAM) | $0.9545 \leq \alpha_F \leq 1.0000$ | OFF (Gray) |
| | $0.7000 + \Delta \leq \alpha_F \leq 0.9545$ | OFF |
| | $0.3000 \leq \alpha_F \leq 0.7000 + \Delta$ | ON |
| | $0.0000 \leq \alpha_F \leq 0.3000$ | ON (Gray) |

In the left column, the different super-constellation combinations are listed, where (16-QAM, QPSK) means the near user is using 16-QAM and the far user is using QPSK (making the super-constellation 64-QAM). In the center column, four different ranges are given for each super-constellation, while the last column indicates what each range is suitable for, i.e., no bit-swapping (OFF), bit-swapping (ON), and where Gray encoding holds (Gray).

A series of simulations were performed, the results of which may be seen in U.S. Provisional Patent Application Ser. No. 62/210,326.

Figure 6:
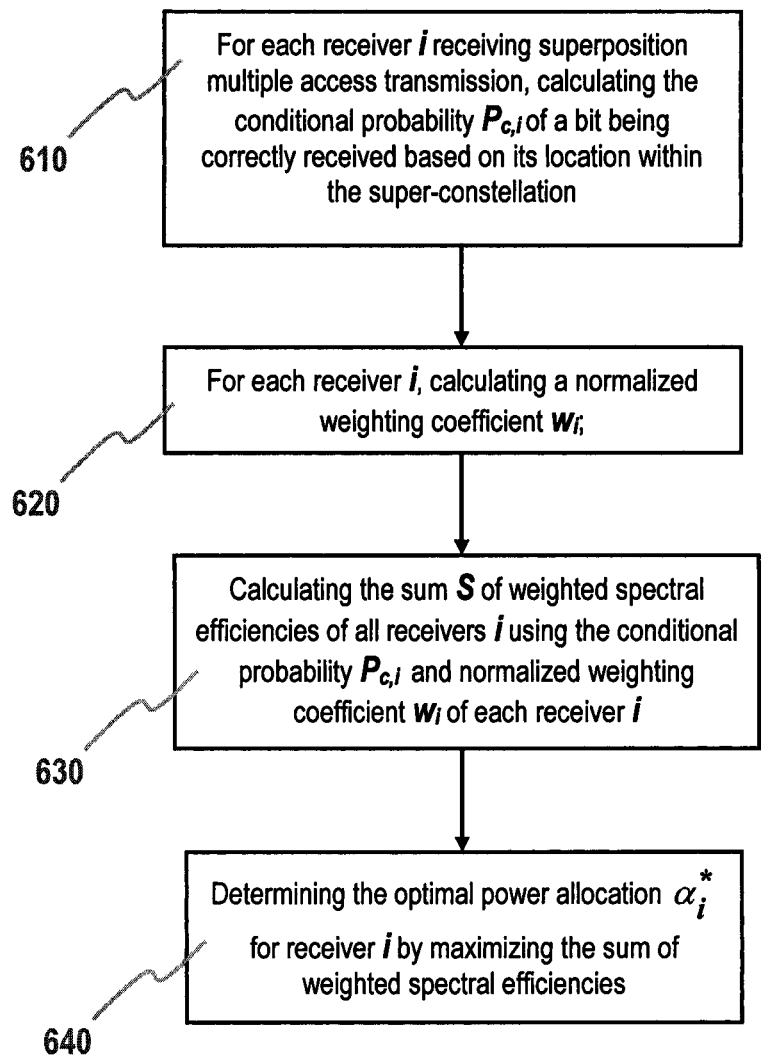
FIG. 6 is a flowchart of a general method of power allocation according to an embodiment of the present disclosure.

FIG. 6 is a flowchart of a more generic method of power allocation according to an embodiment of the present disclosure. In FIG. 6, a superposition multiple access communication system capable of using uniform and non-uniform superposition constellations (super-constellations) is assumed. In 610, for each receiver i receiving superposition multiple access transmission, calculating the conditional probability $P_{c,i}$ of a bit being correctly received based on its location within the super-constellation. In 620, the normalized weighting coefficient $w_i$ is calculated for each receiver i. In 630, the sum S of weighted spectral efficiencies of all receivers i is calculated using the conditional probability $P_{c,i}$ and normalized weighting coefficient $W_i$ of each receiver i. In 640, the optimal power allocation $\alpha^*_i$ for receiver i is determined by maximizing the sum of weighted spectral efficiencies.

Figure 7:
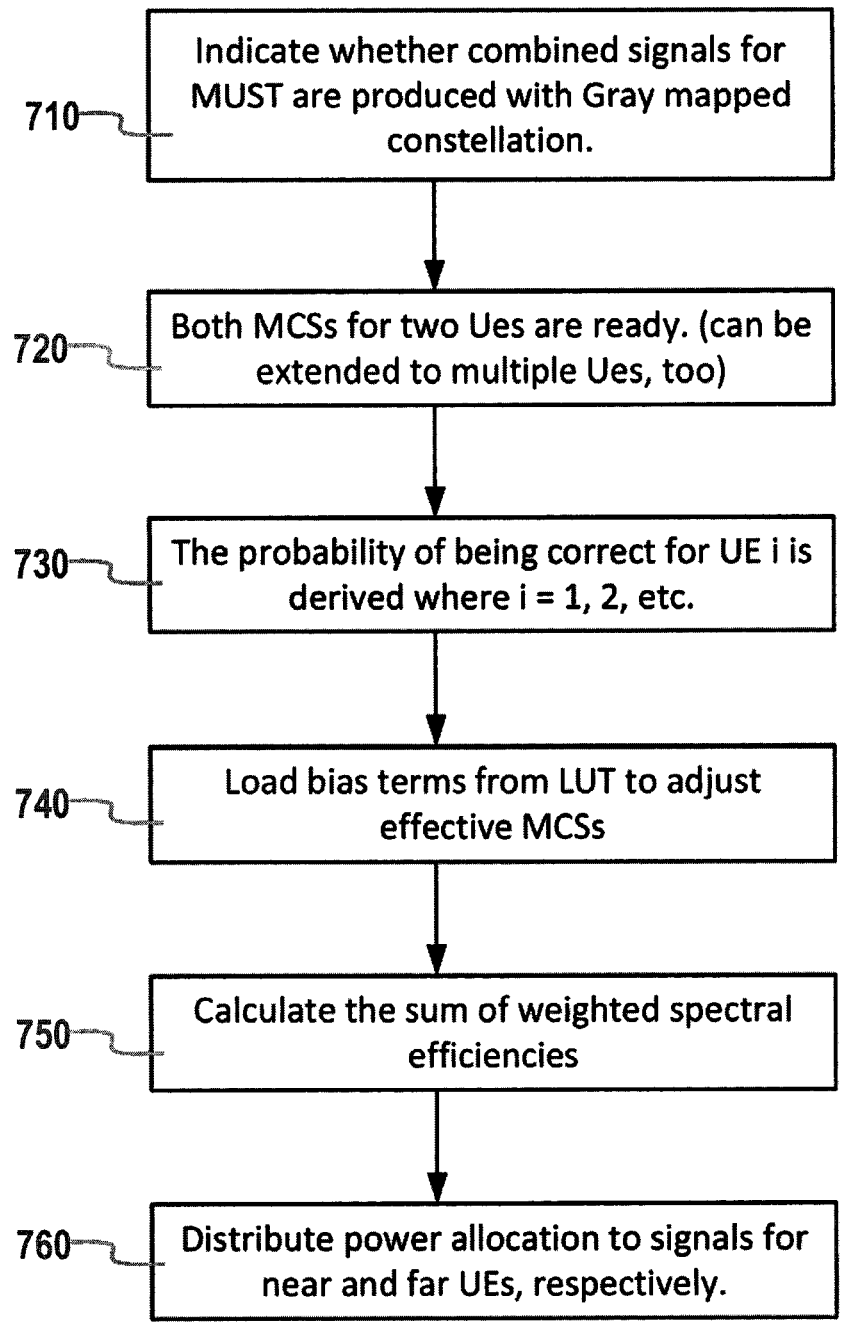
FIG. 7 is a flowchart of a more specific method of power allocation according to an embodiment of the present disclosure.

FIG. 7 is a flowchart of a method of power allocation according to an embodiment of the present disclosure. At 710, it is determined whether the superposition super-constellation as produced as a GNC super-constellation ("Indicate whether combined signals for MUST are produced with Gray mapped constellation"). It is expected that the UE receive high-layer signaling regarding the information of super-positioned signals. At 720, the MCSs for the UEs are ready ("Both MCSs for two UEs are ready (even can be extended to multiple UEs, too)"). The UE could blindly estimate the modulation order by itself or receive this information from eNB via high-layer signaling. If a coding rate of co-scheduled UE could not be blindly estimated, it is possible to consider a high code rate for conservative operation. At 730, the probability of being correct for UE i is derived where i=1, 2, 3, . . . , k, as explained herein. At 740, bias terms are loaded from the LUT to adjust effective MCSs. At 750, the sum of weighted spectral efficiencies is calculated. At 760, the power allocation for signals is distributed to the respective UEs.

Depending on the embodiment of the present disclosure, steps and/or operations in accordance with the present disclosure may occur in a different order, or in parallel, or concurrently for different epochs, etc., in different embodiments, as would be understood by one of ordinary skill in the art. Similarly, as would be understood by one of ordinary skill in the art, FIGS. 6 and 7 are simplified representations of the actions performed, and real-world implementations may perform the actions in a different order or by different ways or means. Similarly, as simplified representations, FIGS. 6 and 7 do not show other required steps as these are known and understood by one of ordinary skill in the art and not pertinent and/or helpful to the present description.

Depending on the embodiment of the present disclosure, some or all of the steps and/or operations may be implemented or otherwise performed, at least in part, on a portable device. "Portable device" as used herein refers to any portable, mobile, or movable electronic device having the capability of receiving wireless signals, including, but not limited to, multimedia players, communication devices, computing devices, navigating devices, etc. Thus, mobile devices include, but are not limited to, laptops, tablet computers, Portable Digital Assistants (PDAs), mp3 players, handheld PCs, Instant Messaging Devices (IMD), cellular telephones, Global Navigational Satellite System (GNSS) receivers, watches, cameras or any such device which can be worn and/or carried on one's person. "User Equipment" or "UE" as used herein corresponds to the usage of that term in the 3GPP LTE/LTE-A protocols, but is not in any way limited by the 3GPP LTE/LTE-A protocols. Moreover, "User Equipment" or "UE" refers to any type of device, including portable devices, which acts as a wireless receiver.

Depending on the embodiment of the present disclosure, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. The one or more non-transitory computer-readable media may be instantiated in software, firmware, hardware, and/or any combination thereof. Moreover, the functionality of any "module" discussed herein may be implemented in software, firmware, hardware, and/or any combination thereof.

The one or more non-transitory computer-readable media and/or means for implementing/performing one or more operations/steps/modules of embodiments of the present disclosure may include, without limitation, application-specific integrated circuits ("ASICs"), standard integrated circuits, controllers executing appropriate instructions (including microcontrollers and/or embedded controllers), field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced in any computer system configuration.

Thus, the term "non-transitory computer-readable medium" as used herein refers to any medium that comprises the actual performance of an operation (such as hardware circuits), that comprises programs and/or higher-level instructions to be provided to one or more processors for performance/implementation (such as instructions stored in a non-transitory memory), and/or that comprises machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read, or any other non-transitory medium from which a computer instruction can be read.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of power allocation in a superposition multiple access communication system capable of using uniform and non-uniform superposition constellations (super-constellations), comprising:

for each receiver i receiving superposition multiple access transmission, calculating the conditional probability $P_{c,i}$ of a symbol being correctly received based on its location within a super-constellation, wherein i is an index of integers from 1 to the total number of receivers receiving superposition multiple access transmission in the super-constellation;

for the each receiver i receiving superposition multiple access transmission, calculating a normalized weighting coefficient $w_i$;

calculating the sum S of weighted spectral efficiencies of all of the each receiver i using the calculated conditional probability $P_{c,i}$ of the each receiver i and the calculated normalized weighting coefficient $w_i$ of the each receiver i; and determining the optimal power allocation $\alpha^*_i$ for the each receiver i by maximizing the sum of weighted spectral efficiencies.

2. The method of claim 1, wherein the superposition multiple access communication system uses Gray-mapped Non-uniform-capable Constellations (GNCs).

3. The method of claim 1, wherein the superposition multiple access communication is Multi-User Superposition Transmission (MUST) of the Long Term Evolution (LTE) standard.

4. The method of claim 1, wherein the conditional probability $P_{c,i}$ is calculated using the following equation:

$$P_{c,i} = \sum_{k=1}^{M} P(\hat{x}_{k,i} = x_{k,i}),$$

where $\hat{x}_{k,i}$ denotes the detected symbol at the kth symbol for receiver i.

5. The method of claim 1, wherein the normalized weighting coefficient $w_i$ is calculated based on at least one of code gain, bit robustness relying on bit location, the Modulation and Coding Scheme (MCS), and proportional fairness (PF).

6. The method of claim 1, wherein the normalized weighting coefficient $w_i$ is calculated using the following equation:

$$w_i = \frac{c_i \log_2 M_i + \Delta_i(c_i, s_i)}{\sum_k (c_k \log_2 M_k + \Delta_k(c_k, s_k))},$$

where $C_i$ is the code rate for receiver i;

$S_i$ is a flag indicating whether receiver i's bits are swapped or not; and $\Delta_i(C_i, s_i)$ is a bias term to compensate at least for the effect of coding gains between inner and outer bits, and is a function of $C_i$ and $S_i$.

7. The method of claim 1, wherein the sum S of weighted spectral efficiencies of all receivers i is calculated using the following equation:

$$S = \sum_{i=1}^{K} w_i P_{c,i},$$

where K is the total number of receivers, the probability $P_{c,i}$ of a detected symbol being correct is defined as:

$$P_{c,i} = \sum_{k=1}^{M} P(\hat{x}_{k,i} = x_{k,i}), \text{ and}$$

$\hat{x}_{k,i}$ denotes the detected symbol at the kth symbol for receiver i.

8. The method of claim 1, wherein there is only a near receiver and a far receiver and the sum S of weighted spectral efficiencies is calculated using the following equation:

$$S = w_F P_{c,F} + w_N P_{c,N},$$

where $W_F$ is the weighted coefficient for the far receiver, where $W_N$ is the weighted coefficient for the near receiver, the probability $P_{c,i}$ of a detected symbol being correct is defined as:

$$P_{c,i} = \Sigma_{k=1}^{M} P(\hat{x}_{k,i} = x_{k,i}), \text{ and}$$

$\hat{x}_{k,i}$ denotes the detected symbol at the kth symbol for receiver i.

9. The method of claim 1, wherein the each receiver i comprises a near receiver and a far receiver; and
determining an optimal power allocation $\alpha^*_F$ for the far receiver is calculated by maximizing the sum of weighted spectral efficiencies using the following equation:

$$\alpha^*_F = \text{argmax}_{\alpha_F \text{range}} S,$$

where $\alpha_F$ range is defined by the modulation orders of the near and far receivers, the number of transmission layers, and whether there is bit-swapping, in the table that follows:

| "Far" receiver constellation ($2^{K_F}$)-QAM | "Near" receiver constellation ($2^{K_N}$)-QAM | Resulting "Super-constellation" ($2^{K_F+K_N}$)-QAM | Bit-Swapped | $\alpha_F$ range for Single Layer | $\alpha_F$ range for Two Layers |
|---|---|---|---|---|---|
| QPSK | QPSK | 16-QAM | OFF | $\alpha_F \geq 0.5$ | $\alpha_F \geq 0.3333$ |
|  |  |  | ON | $\alpha_F \leq 0.5$ | $\alpha_F \leq 0.3333$ |
| 16-QAM | QPSK | 64-QAM | OFF | $\alpha_F \geq 0.6429$ | $\alpha_F \geq 0.4737$ |
|  |  |  | ON | $\alpha_F \leq 0.1667$ | $\alpha_F \leq 0.0909$ |
| QPSK | 16-QAM | 64-QAM | OFF | $\alpha_F \geq 0.8333$ | $\alpha_F \geq 0.7143$ |
|  |  |  | ON | $\alpha_F \leq 0.3571$ | $\alpha_F \leq 0.2174$ |
| 16-QAM | 16-QAM | 256-QAM | OFF | $\alpha_F \geq 0.9$ | $\alpha_F \geq 0.8182$ |
|  |  |  | ON | $\alpha_F \leq 0.1$ | $\alpha_F \leq 0.0526$ |
| 64-QAM | QPSK | 256-QAM | OFF | $\alpha_F \geq 0.7$ | $\alpha_F \geq 0.5385$ |
|  |  |  | ON | $\alpha_F \leq 0.0455$ | $\alpha_F \leq 0.0233$ |
| QPSK | 64-QAM | 256-QAM | OFF | $\alpha_F \geq 0.9545$ | $\alpha_F \geq 0.9130$ |
|  |  |  | ON | $\alpha_F \leq 0.3$ | $\alpha_F \leq 0.1795$. |

10. The method of claim 1, wherein there is only a near receiver and a far receiver, the method further comprising:
determining whether to perform bit-swapping between the near and far receivers, where the determination made depending on the value of $\alpha_F$ using the following table:

| (Near, Far) | | Bit-Swapped |
|---|---|---|
| (16QAM, QPSK) | $0.6429 \leq \alpha_F \leq 1.0000$ | OFF (Gray) |
|  | $0.4444 + \Delta \leq \alpha_F \leq 0.6429$ | OFF |
|  | $0.1667 \leq \alpha_F \leq 0.4444 + \Delta$ | ON |
|  | $0.0000 \leq \alpha_F \leq 0.1667$ | ON (Gray) |
| (QPSK, 16QAM) | $0.8333 \leq \alpha_F \leq 1.0000$ | OFF (Gray) |
|  | $0.5556 + \Delta \leq \alpha_F \leq 0.8333$ | OFF |
|  | $0.3571 \leq \alpha_F \leq 0.5556 + \Delta$ | ON |
|  | $0.0000 \leq \alpha_F \leq 0.3571$ | ON (Gray) |
| (16QAM, 16QAM) | $0.9000 \leq \alpha_F \leq 1.0000$ | OFF (Gray) |
|  | $0.6923 + \Delta \leq \alpha_F \leq 0.9000$ | OFF |
|  | $0.1000 \leq \alpha_F \leq 0.6923 + \Delta$ | ON |
|  | $0.0000 \leq \alpha_F \leq 0.1000$ | ON (Gray) |
| (64QAM, QPSK) | $0.7000 \leq \alpha_F \leq 1.0000$ | OFF (Gray) |
|  | $0.4324 + \Delta \leq \alpha_F \leq 0.7000$ | OFF |
|  | $0.0455 \leq \alpha_F \leq 0.4324 + \Delta$ | ON |
|  | $0.0000 \leq \alpha_F \leq 0.0455$ | ON (Gray) |
| (QPSK, 64QAM) | $0.9545 \leq \alpha_F \leq 1.0000$ | OFF (Gray) |
|  | $0.7000 + \Delta \leq \alpha_F \leq 0.9545$ | OFF |
|  | $0.3000 \leq \alpha_F \leq 0.7000 + \Delta$ | ON |
|  | $0.0000 \leq \alpha_F \leq 0.3000$ | ON (Gray). |

11. An apparatus for power allocation in a superposition multiple access communication system capable of using uniform and non-uniform superposition constellations (super-constellations), comprising:
at least one non-transitory computer-readable medium storing instructions capable of execution by a processor; and
at least one processor capable of executing instructions stored on the at least one non-transitory computer-readable medium, where the execution of the instructions results in the apparatus performing a method comprising:
for each receiver i receiving superposition multiple access transmission, calculating the conditional probability $P_{c,i}$ of a symbol being correctly received based on its location within a super-constellation, wherein i is an index of integers from 1 to the total number of receivers receiving superposition multiple access transmission in the super-constellation;
for the each receiver i receiving superposition multiple access transmission, calculating a normalized weighting coefficient $w_i$;
calculating the sum S of weighted spectral efficiencies of all of the each receiver i using the calculated conditional probability $P_{c,i}$ of the each receiver i and the calculated normalized weighting coefficient $w_i$ of the each receiver i; and
determining the optimal power allocation $\alpha^*_i$; for the each receiver i by maximizing the sum of weighted spectral efficiencies.

12. The apparatus of claim 11, wherein the superposition multiple access communication system uses Gray-mapped Non-uniform-capable Constellations (GNCs).

13. The apparatus of claim 11, wherein the superposition multiple access communication is Multi-User Superposition Transmission (MUST) of the Long Term Evolution (LTE) standard.

14. The apparatus of claim 11, wherein the normalized weighting coefficient $w_i$ is calculated based on at least one of code gain, bit robustness relying on bit location, the Modulation and Coding Scheme (MCS), and proportional fairness (PF).

15. The apparatus of claim 11, wherein the normalized weighting coefficient $w_i$ is calculated using the following equation:

$$w_i = \frac{c_i \log_2 M_i + \Delta_i(c_i, s_i)}{\Sigma_k (c_k \log_2 M_k + \Delta_k(c_k, s_k))},$$

where
$C_i$ is the code rate for receiver i;
$S_i$ is a flag indicating whether receiver i's bits are swapped or not; and
$\Delta_i (C_i, S_i)$ is a bias term to compensate at least for the effect of coding gains between inner and outer bits, and is a function of $C_i$ and $S_i$.

16. The apparatus of claim 11, wherein the sum S of weighted spectral efficiencies of all receivers i is calculated using the following equation:

$$S = \sum_{i=1}^{K} w_i P_{c,i},$$

where K is the total number of receivers,
the probability $P_{c,i}$ of a detected symbol being correct is defined as:

$$P_{c,i} = \Sigma_{k=1}^{M} P(\hat{x}_{k,i} = x_{k,i}), \text{ and}$$

$\hat{x}_{k,i}$ denotes the detected symbol at the kth symbol for receiver i.

17. The apparatus of claim 11, wherein there is only a near receiver and a far receiver and the sum S of weighted spectral efficiencies is calculated using the following equation:

$$S = w_F P_{c,F} + w_N P_{c,N},$$

where $w_F$ is the weighted coefficient for the far receiver,
where $w_N$ is the weighted coefficient for the near receiver,
the probability $P_{c,i}$ of a detected symbol being correct is defined as:

$$P_{c,i} = \Sigma_{k=1}^{M} P(\hat{x}_{k,i} = x_{k,i}), \text{ and}$$

$\hat{x}_{k,i}$ denotes the detected symbol at the kth symbol for receiver i.

18. The apparatus of claim 11, wherein the each receiver i comprises a near receiver and a far receiver; and
determining an optimal power allocation $\alpha^*_F$ for the far receiver is calculated by maximizing the sum of weighted spectral efficiencies using the following equation:

$$\alpha^*_F = \text{argmax}_{60 \text{ }F \text{ range}} S,$$

where $\alpha_F$ range is defined by the modulation orders of the near and far receivers, the number of transmission layers, and whether there is bit-swapping, in the table that follows:

| "Far" receiver constellation ($2^{K_F}$)-QAM | "Near" receiver constellation ($2^{K_N}$)-QAM | Resulting "Super-constellation" ($2^{K_F+K_N}$)-QAM | Bit-Swapped | $\alpha_F$ range for Single Layer | $\alpha_F$ range for Two Layers |
|---|---|---|---|---|---|
| QPSK | QPSK | 16-QAM | OFF | $\alpha_F \geq 0.5$ | $\alpha_F \geq 0.3333$ |
|  |  |  | ON | $\alpha_F \leq 0.5$ | $\alpha_F \leq 0.3333$ |
| 16-QAM | QPSK | 64-QAM | OFF | $\alpha_F \geq 0.6429$ | $\alpha_F \geq 0.4737$ |
|  |  |  | ON | $\alpha_F \leq 0.1667$ | $\alpha_F \leq 0.0909$ |
| QPSK | 16-QAM | 64-QAM | OFF | $\alpha_F \geq 0.8333$ | $\alpha_F \geq 0.7143$ |
|  |  |  | ON | $\alpha_F \leq 0.3571$ | $\alpha_F \leq 0.2174$ |
| 16-QAM | 16-QAM | 256-QAM | OFF | $\alpha_F \geq 0.9$ | $\alpha_F \geq 0.8182$ |
|  |  |  | ON | $\alpha_F \leq 0.1$ | $\alpha_F \leq 0.0526$ |
| 64-QAM | QPSK | 256-QAM | OFF | $\alpha_F \geq 0.7$ | $\alpha_F \geq 0.5385$ |
|  |  |  | ON | $\alpha_F \leq 0.0455$ | $\alpha_F \leq 0.0233$ |
| QPSK | 64-QAM | 256-QAM | OFF | $\alpha_F \geq 0.9545$ | $\alpha_F \geq 0.9130$ |
|  |  |  | ON | $\alpha_F \leq 0.3$ | $\alpha_F \leq 0.1795$. |

19. The apparatus of claim 11, wherein there is only a near receiver and a far receiver, where the method performed by the apparatus further comprises:
determining whether to perform bit-swapping between the near and far receivers, where the determination made depending on the value of $\alpha_F$ using the following table:

| (Near, Far) |  | Bit-Swapped |
|---|---|---|
| (16QAM, QPSK) | $0.6429 \leq \alpha_F \leq 1.0000$ | OFF (Gray) |
|  | $0.4444 + \Delta \leq \alpha_F \leq 0.6429$ | OFF |
|  | $0.1667 \leq \alpha_F \leq 0.4444 + \Delta$ | ON |
|  | $0.0000 \leq \alpha_F \leq 0.1667$ | ON (Gray) |
| (QPSK, 16QAM) | $0.8333 \leq \alpha_F \leq 1.0000$ | OFF (Gray) |
|  | $0.5556 + \Delta \leq \alpha_F \leq 0.8333$ | OFF |
|  | $0.3571 \leq \alpha_F \leq 0.5556 + \Delta$ | ON |
|  | $0.0000 \leq \alpha_F \leq 0.3571$ | ON (Gray) |
| (16QAM, 16QAM) | $0.9000 \leq \alpha_F \leq 1.0000$ | OFF (Gray) |
|  | $0.6923 + \Delta \leq \alpha_F \leq 0.9000$ | OFF |
|  | $0.1000 \leq \alpha_F \leq 0.6923 + \Delta$ | ON |
|  | $0.0000 \leq \alpha_F \leq 0.1000$ | ON (Gray) |
| (64QAM, QPSK) | $0.7000 \leq \alpha_F \leq 1.0000$ | OFF (Gray) |
|  | $0.4324 + \Delta \leq \alpha_F \leq 0.7000$ | OFF |
|  | $0.0455 \leq \alpha_F \leq 0.4324 + \Delta$ | ON |
|  | $0.0000 \leq \alpha_F \leq 0.0455$ | ON (Gray) |
| (QPSK, 64QAM) | $0.9545 \leq \alpha_F \leq 1.0000$ | OFF (Gray) |
|  | $0.7000 + \Delta \leq \alpha_F \leq 0.9545$ | OFF |
|  | $0.3000 \leq \alpha_F \leq 0.7000 + \Delta$ | ON |
|  | $0.0000 \leq \alpha_F \leq 0.3000$ | ON (Gray). |

* * * * *